United States Patent
Niemeyer et al.

(10) Patent No.: US 7,710,061 B2
(45) Date of Patent: May 4, 2010

(54) MOTOR CONTROL AMPLIFIER

(75) Inventors: Günter Niemeyer, Mountain View, CA (US); Nicola Diolaiti, Palo Alto, CA (US); Neal A. Tanner, Burnet, TX (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 360 days.

(21) Appl. No.: 11/891,052

(22) Filed: Aug. 7, 2007

(65) Prior Publication Data

US 2008/0048604 A1   Feb. 28, 2008

Related U.S. Application Data

(60) Provisional application No. 60/836,209, filed on Aug. 7, 2006.

(51) Int. Cl.
   *H02P 31/00* (2006.01)
(52) U.S. Cl. .................................. 318/628; 318/560
(58) Field of Classification Search ................. 318/628, 318/560
   See application file for complete search history.

(56) References Cited

U.S. PATENT DOCUMENTS

| | | | |
|---|---|---|---|
| 4,694,229 A * | 9/1987 | Cormack | 318/561 |
| 4,810,941 A * | 3/1989 | Ohishi et al. | 388/815 |
| 4,980,620 A * | 12/1990 | Losic et al. | 318/268 |
| 5,020,125 A * | 5/1991 | Losic et al. | 388/811 |
| 5,134,354 A * | 7/1992 | Yamamoto et al. | 318/609 |
| 6,310,457 B1 * | 10/2001 | Iwashita et al. | 318/570 |
| 6,469,465 B1 * | 10/2002 | Belser et al. | 318/560 |

OTHER PUBLICATIONS

Mehling, Joshua et al. "Increasing the Impedance Range of a Haptic Display by Adding Electrical Damping." 2005. Proceedings of the First Joint Eurohaptics Conference & Symposium on Haptic Interfaces for Virtual Environment & Teleoperator Systems.

* cited by examiner

*Primary Examiner*—Bentsu Ro
*Assistant Examiner*—David S Luo
(74) *Attorney, Agent, or Firm*—Lumen Patent Firm

(57) ABSTRACT

A motor control amplifier for position feedback control is provided utilizing the inherent inductor and/or resistor dynamics of the motor. The motor control amplifier applies a voltage to the motor equivalent to the electrical motor resistance multiplied by the current of the motor, canceling out the electrical motor resistance, and thereby providing position feedback control through motor inductance. A command term/voltage could be added to make the position feedback control relative to a setpoint. Further, a motor control amplifier for feedback control to arbitrary dynamics is provided. The motor amplifier applies a voltage proportional to a wave command signal. The motor amplifier has a sensing component to provide a wave return signal to construct a wave transformer from the electrical motor resistance.

7 Claims, 12 Drawing Sheets

US 7,710,061 B2

MOTOR CONTROL AMPLIFIER

CROSS-REFERENCE TO RELATED APPLICATIONS

This application is cross-referenced to and claims the benefit from U.S. Provisional Patent Application 60/836,209 filed Aug. 7, 2006, which is hereby incorporated by reference in its entirety for all that it discloses.

STATEMENT REGARDING FEDERALLY SPONSORED RESEARCH OR DEVELOPMENT

The present invention was supported in part by grant number R33 LM 007295 both from the National Institutes of Health (NIH). The U.S. Government has certain rights in the invention.

FIELD OF THE INVENTION

The invention relates generally to haptics, robotics and motor control. In particular, the invention relates to motor control amplifiers exploiting the inductor and resistor dynamics of the motor.

BACKGROUND

Haptics, robotics, telerobotics and more generally motion control rely on high stiffness position control of electric motors. Traditionally, DC-motors are driven by current amplifiers designed to hide their electrical dynamics. Meanwhile encoder-based position feedback creates virtual springs. Unfortunately, this cancellation-replacement approach experiences performance limits due to sensor quantization, discretization, and amplifier bandwidths. The present invention advances the art with an alternate approach, noting that the inherent inductor-resistor dynamics of the motor can be beneficial to motor control in general and specifically haptic, robotic, and telerobotic tasks.

SUMMARY OF THE INVENTION

The invention provides a motor control amplifier for position feedback control useful to motor control, haptics, robotics, and telerobotics. An amplifier is electrically coupled to an electrical motor, and in one embodiment, the amplifier could be implemented as an analog circuit.

This amplifier applies a voltage to the motor equivalent to the electrical resistance of the motor multiplied by the current of the motor. Accordingly, the amplifier is characterized by canceling out the electrical resistance of the motor and thereby provides position feedback control through the inductance of the motor.

Position feedback control could also be applied relative to a setpoint. This is accomplished by having the applied voltage equivalent to the electrical resistance of the motor multiplied the current of the motor plus a command term or voltage. Accordingly, the amplifier is characterized by canceling out the electrical resistance of the motor and thereby provides the position feedback control relative to the setpoint through the inductance of the motor.

The invention further provides a motor amplifier for feedback control to arbitrary dynamics. Here, a motor amplifier is electrically coupled to a motor. The motor amplifier applies a voltage to the motor, whereby the applied voltage is proportional to a wave command signal. The motor amplifier further includes a sensing component to provide a wave return signal. The wave return signal is constructed from a measurement of the current in the motor and the wave command signal, thereby constructing a wave transformer from the electrical motor resistance.

Apparatus and methods embodied by this invention are very appealing for motor control tasks since it utilizes the inherent inductor and/or resistor dynamics of the motor.

BRIEF DESCRIPTION OF THE FIGURES

The objectives and advantages of the present invention will be understood by reading the following detailed description in conjunction with the drawing, in which.

DETAILED DESCRIPTION OF THE INVENTION

This invention provides an alternate approach to the control of electric motors. The description discusses the invention with respect to haptics. However, it is noted that these exemplary teachings are not restricted to haptics as they are also beneficial and apply to fields like robotics, tele-operations and more generally motor control as a person of average skill would readily appreciate.

First, the inventors recognized that a haptic interface acts as a transducer that transfers power between the user and device in the mechanical domain and the virtual environment. The fact that the DC motor itself is a transducer that couples mechanical and electrical domains in a stable fashion is often overlooked in the field of haptics. This assumption is justified by the behavior of current amplifiers, which use an internal feedback loop to speed up the electrical dynamics while rejecting back-EMF effects that are treated as disturbances.

Figure 1:
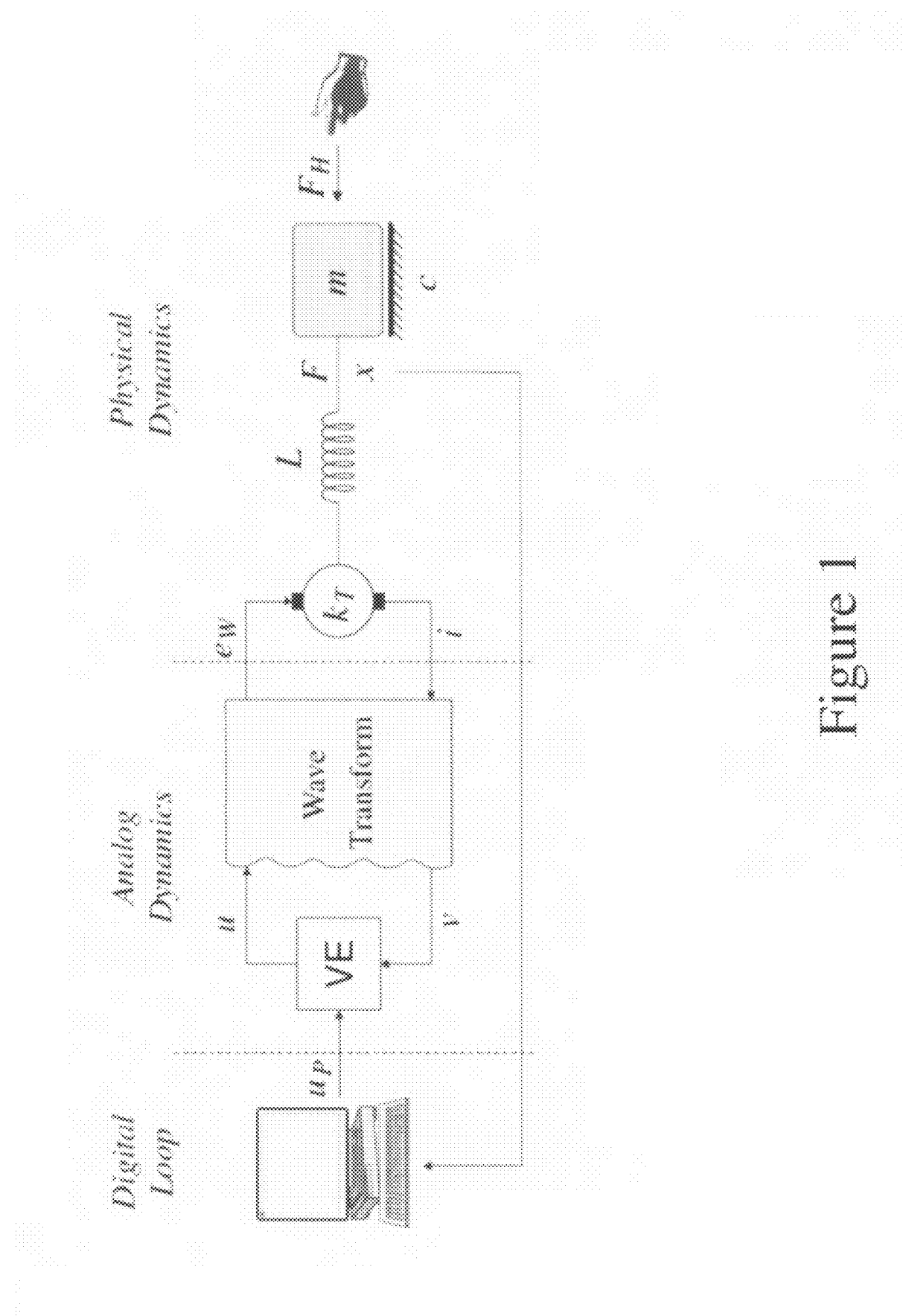
FIG. 1 shows a wave haptics approach according to the present invention. Analog circuitry implements an energy consistent inner loop for stable interaction at high frequency. An external digital loop ensures low frequency accuracy. The motor inductance acts as elastic coupling to the user.

A careful analysis of motor dynamics shows that the electrical inductance L provides a natural stiffness that can couple the virtual environment to the user without a position sensor. The effect is inherently available at high frequencies and can be exploited in the bandwidth of human perception through a simple analog circuit. It does not suffer from the traditional limitations and can provide a seven-fold stiffness improvement on typical hardware. To provide a fully functional haptic interface, this analog circuit, which replaces the traditional current amplifiers, still needs a computer interface. To not squander the improvements, the circuit can utilize the electrical resistance R to implement a wave transformation (Niemeyer and Slotine 1997, 2004; Stramigioli et al. 2002). Interfacing in wave variables can be robust to sampling delays, providing a more explicit description of power flows and passivity. Encoder-based position feedback in a digital loop is necessary only at low frequencies to counter any motor parametric uncertainty. This relaxes sensor requirements and improves stability characteristics. The overall approach is illustrated in FIG. 1.

The description is organized as follows. Motor dynamics are briefly recalled and the mechanical equivalents of electrical dynamics are derived. Their potential to provide encoderless force feedback and position holding is then discussed. Then a general framework of wave variables is presented that, through a simple analog circuit, provides an interface between electrical dynamics and virtual environments necessary for haptic rendering. The design of a digital control loop is discussed which provides robustness to parametric uncertainties. It is concluded that the new approach is able to stably render high stiffnesses, especially at high frequency, thus matching the characteristics of the human kinesthetic perception.

Motor Dynamics

Figure 2A:
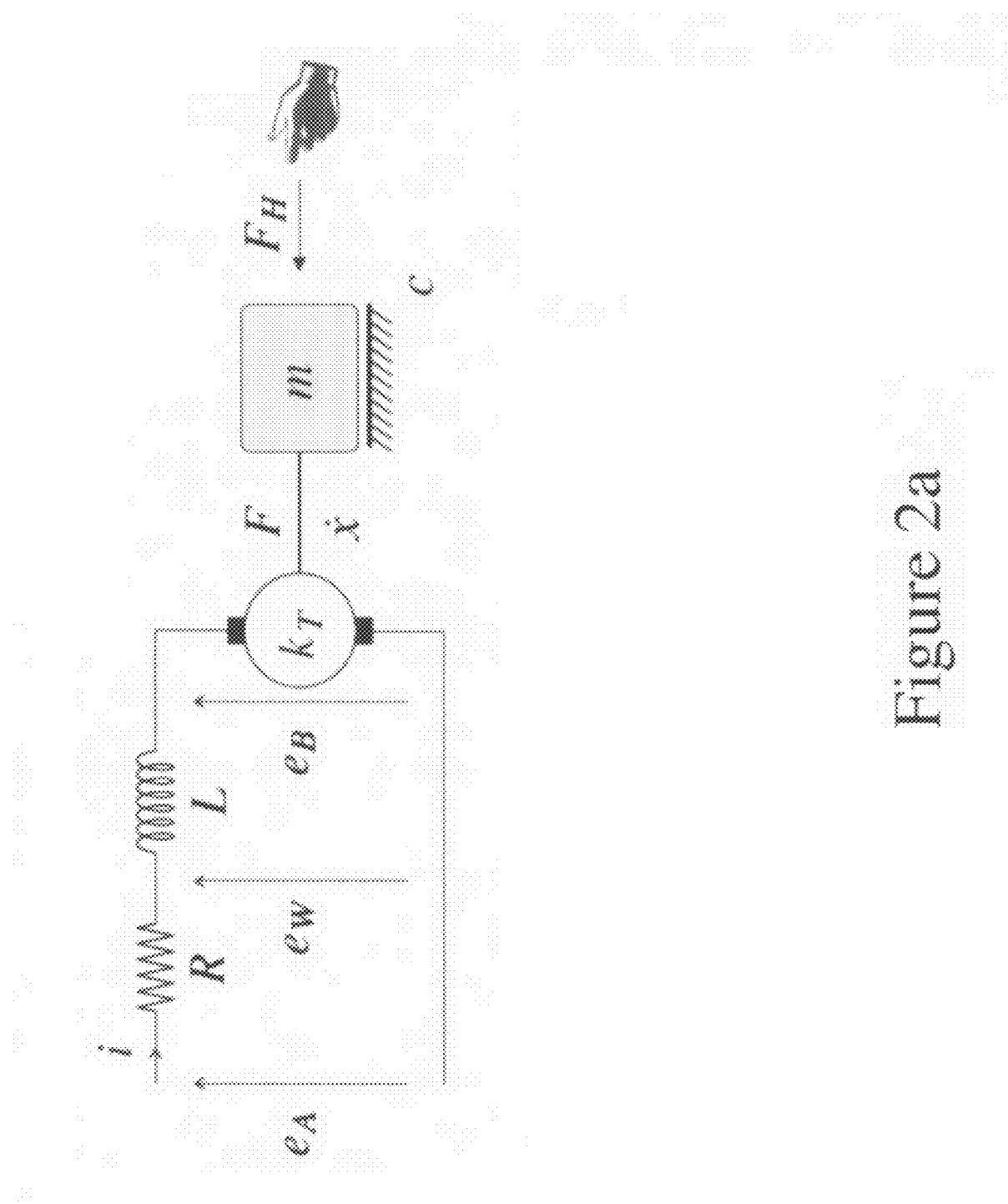
FIG. 2a shows the electrical and mechanical motor dynamics according to the present invention.
Figure 2B:
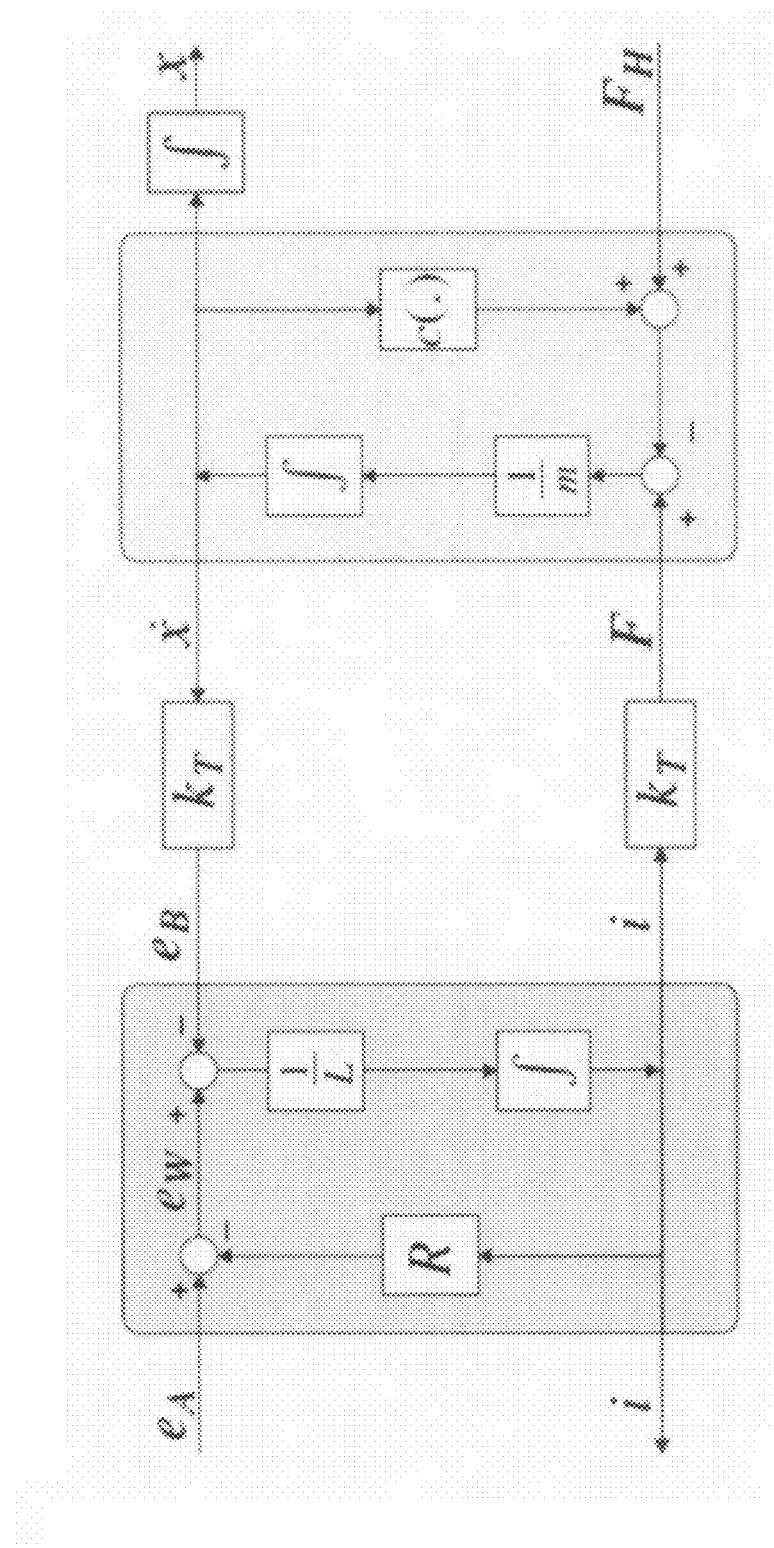
FIG. 2b shows the electrical and mechanical motor dynamics in an equivalent block scheme according to the present invention.

Though generally ignored under the assumptions of an ideal actuator and perfect current amplification, the electrical dynamics of a DC motor are well known to be:

$$e_A(t) = Ri(t) + L\frac{di(t)}{dt} + e_B(t) \quad (1)$$

$$e_B(t) = k_T \dot{x}(t) \quad (2)$$

where $e_A$ is the applied voltage to the armature circuit including the resistance R, the inductance L and the back-EMF voltage eB. The mechanical dynamics are given as:

$$m\ddot{x}(t) = F(t) - c(\dot{x}(t)) - F_H(t) \quad (3)$$

$$F(t) = k_T i(t) \quad (4)$$

where m is the rotor inertia, c is the (nonlinear) friction and $F_H$ is the user torque opposing the motion $\dot{x}$ of the rotor. The torque constant and back-EMF constant are the same physical parameter and are both denoted by $k_T$. The dynamic system is illustrated in FIG. 2a and represented in block diagram form in FIG. 2b.

As stated by equations (2) and (4), the actuator couples the mechanical and electrical domains. Hence, it is possible to take advantage of the coupling equations to interpret the electrical dynamics in the mechanical domain.

Coupling equations (2) and (4) relate torque to current and voltage to velocity. Since the inductance L sets a current proportional to the integral of the its terminal voltage, it corresponds to a spring of stiffness:

$$K_L = \frac{k_T^2}{L} \quad (5)$$

which generates a torque F proportional to the integral of the differential velocity of its endpoints. Similarly, the resistance R maps into a mechanical viscous damper:

$$B_R = \frac{k_T^2}{R} \quad (6)$$

Figure 3:
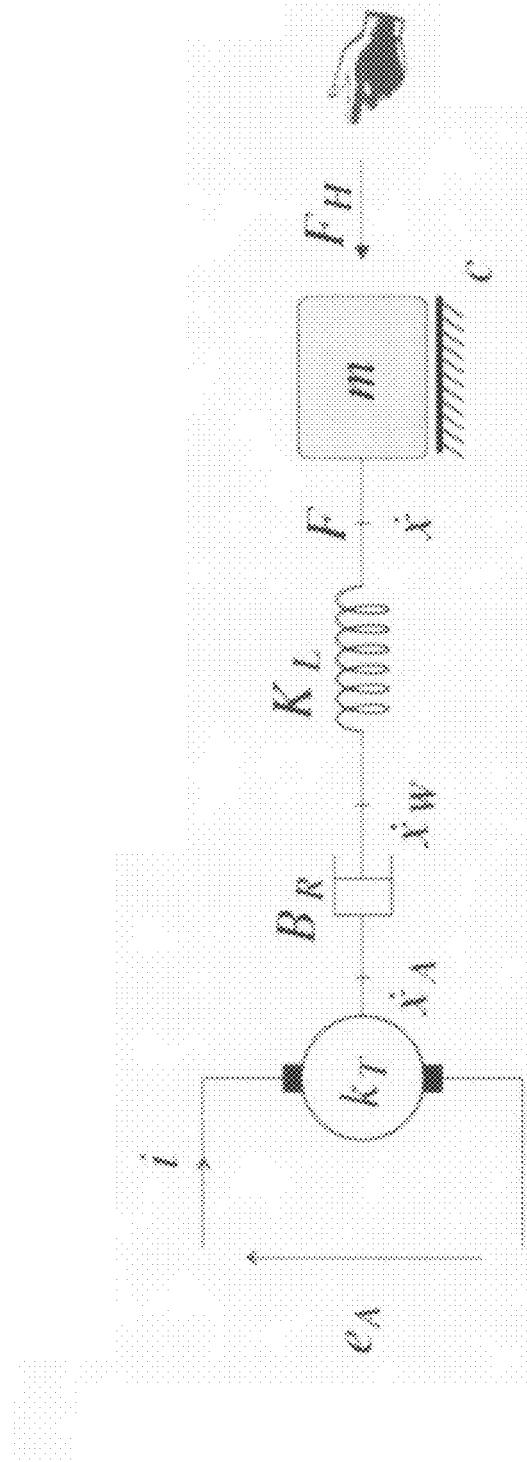
FIG. 3 shows the motor inductance L and resistance R interpreted as series connection of a spring $K_L = k_T^2/L$ and a viscous damper $B_R = k_T^2/R$ according to the present invention.

As shown in FIG. 3, the equivalent spring and damper share the same torque F, hence they are connected in series between the rotor inertia and the energy conversion element, which corresponds to a gyrator in bond graph terms. Indeed in the language of bond graphs, the inductor and resistor connected to a 1-junction in the electrical domain can be pulled through the gyrator to appear as their mirror elements attached to a 0-junction in the mechanical domain.

Because of the series connection, the motor's behavior is dominated by the damper in the range of frequencies of kinesthetic interaction and the stiffness is often overlooked. A shorted motor feels highly damped, while the stiffness is only apparent for the first few milliseconds.

With low inductance motors commonly used in haptics, $K_L$ can be a very high stiffness. As an example, for the Maxon RE 25 motors found in the PHANToM 1.0 with values of $k_T$=43.8 mNm/A and L=0.83 mH, we have $K_L$=2.31 Nm/rad. With an approximate 8:1 gear ratio and lever arm of 14 cm the corresponding tip stiffness reaches 7500 N/m. For comparison, the maximum stable value of a virtual spring implemented according to the traditional scheme has been found by the inventors to be approximately 1100 N/m), corresponding to about 0.34 Nm/rad in joint space.

Therefore, a control scheme that treats the motor inductance as a spring in mechanical series and directly controls $\dot{x}_W$ could stably render higher overall stiffnesses than traditional approaches. Indeed $K_L$ is a physical element of the system, so it is not affected by the non-idealities of the digital control loop that cause energetic inconsistencies and lead to instability. Moreover, because velocity information is inherently obtained through the back-EMF effect of the motor, this force feedback does not require an actual position sensor and operates naturally at high frequencies.

Encoderless Position Holding

In this exemplary embodiment, we begin with the task of building a controller that locks the position of the motor without using explicit position sensing and feedback. Because we are attempting to directly control $\dot{x}_W$, we consider the inductance L to exist in the mechanical domain as $K_L$ while retaining the resistance R in the electrical domain. This configuration is illustrated graphically in FIG. 4a and in block diagram form in FIG. 4b. This assumption simplifies the electrical dynamics into purely algebraic relationships that can be easily controlled:

$$e_W = e_A - Ri \tag{7}$$

$$\dot{x}_W = \frac{e_W}{k_T}$$

To this end, it is sufficient to design an analog voltage drive that actively compensates for motor resistance R by setting:

$$e_A = Ri \rightarrow e_W = 0 \rightarrow \dot{x}_w = 0 \tag{8}$$

By using knowledge of the motor's resistance to regulate the voltage across the energy conversion element to zero, we force the velocity at the spring end-point to zero. We allow the motor inductance to provide the coupling between $x_W$ and the actual rotor position x. The end result is that the user feels a rigid constraint through the high stiffness of $K_L$.

Figure 5:
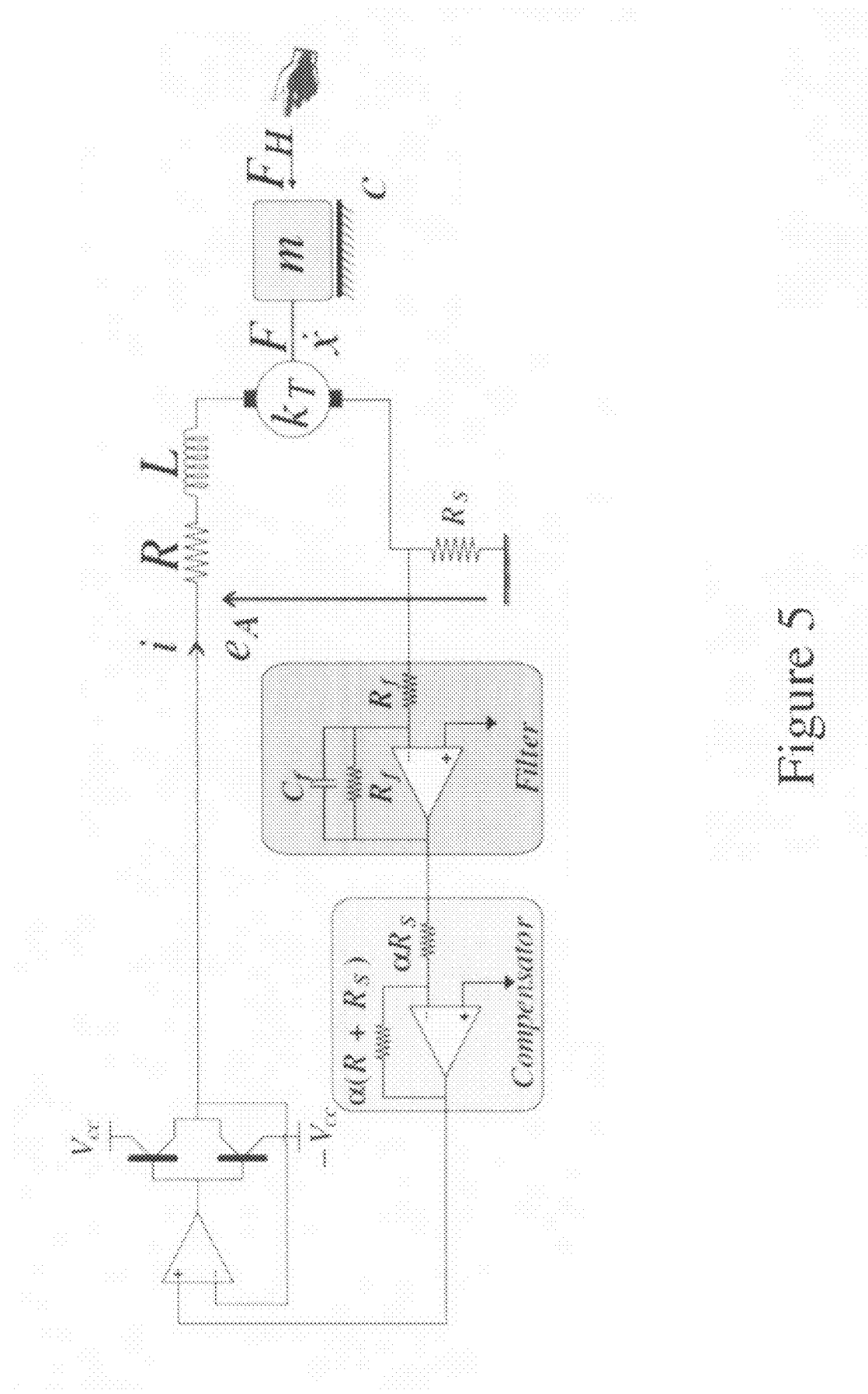
FIG. 5 shows an example diagram of a position holding analog circuit according to the present invention.

An exemplary implementation based on elementary op-amp blocks is shown in FIG. 5. A voltage proportional to the current i is derived by means of a sense resistor $R_s$ and, through a low-pass filter that is needed to attenuate high frequency noise, is fed to the compensator that amplifies it by a factor of $(R+R_S)/R_S$ (the coefficient α scales the actual resistors to values that guarantee a good signal to noise ratio for the op-amps). The overall transfer function is:

$$E_A(s) = \frac{R + R_S}{R_S} \frac{1}{R_f C_f s + 1} R_S I(s) \tag{9}$$

and at frequencies not attenuated by the filter corresponds to equation (8), where the total resistance that has to be compensated is $R+R_S$. Finally two complementary power transistors in push-pull configuration are used to apply the commanded voltage to the motor.

Servoing to Moving Setpoint

To allow greater freedom and to incorporate the ability to program different behaviors, we can move the spring endpoint $x_W$ by including an additional voltage into the applied voltage defined by (8) and (9). This additional voltage determines a velocity of the spring endpoint and thereby describes the motion of the set point.

Wave-Haptics

Figure 4A:
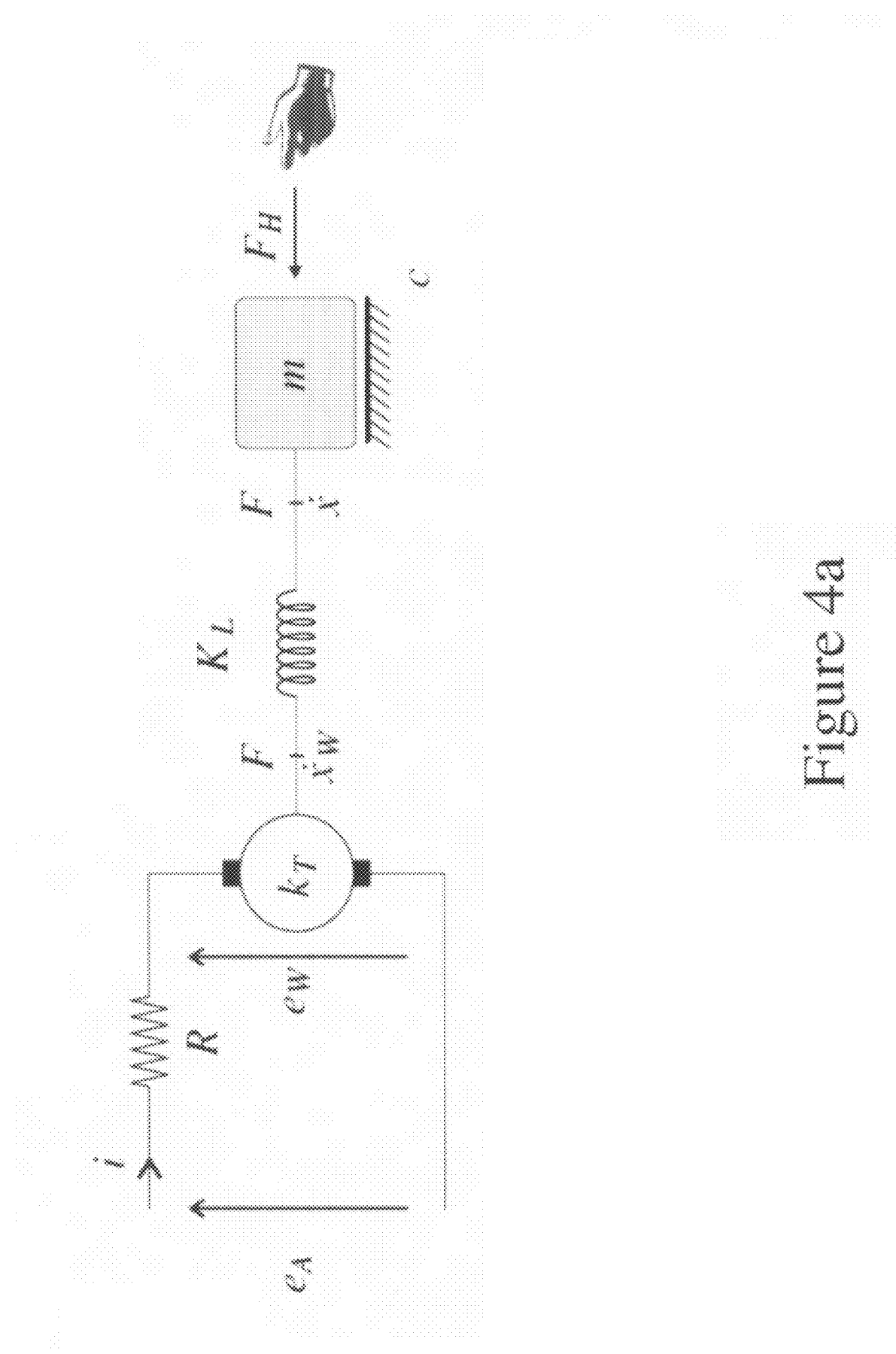
FIG. 4a shows the system dynamics with the motor inductance interpreted in the mechanical domain as a spring $K_L$ according to the present invention.
Figure 4B:
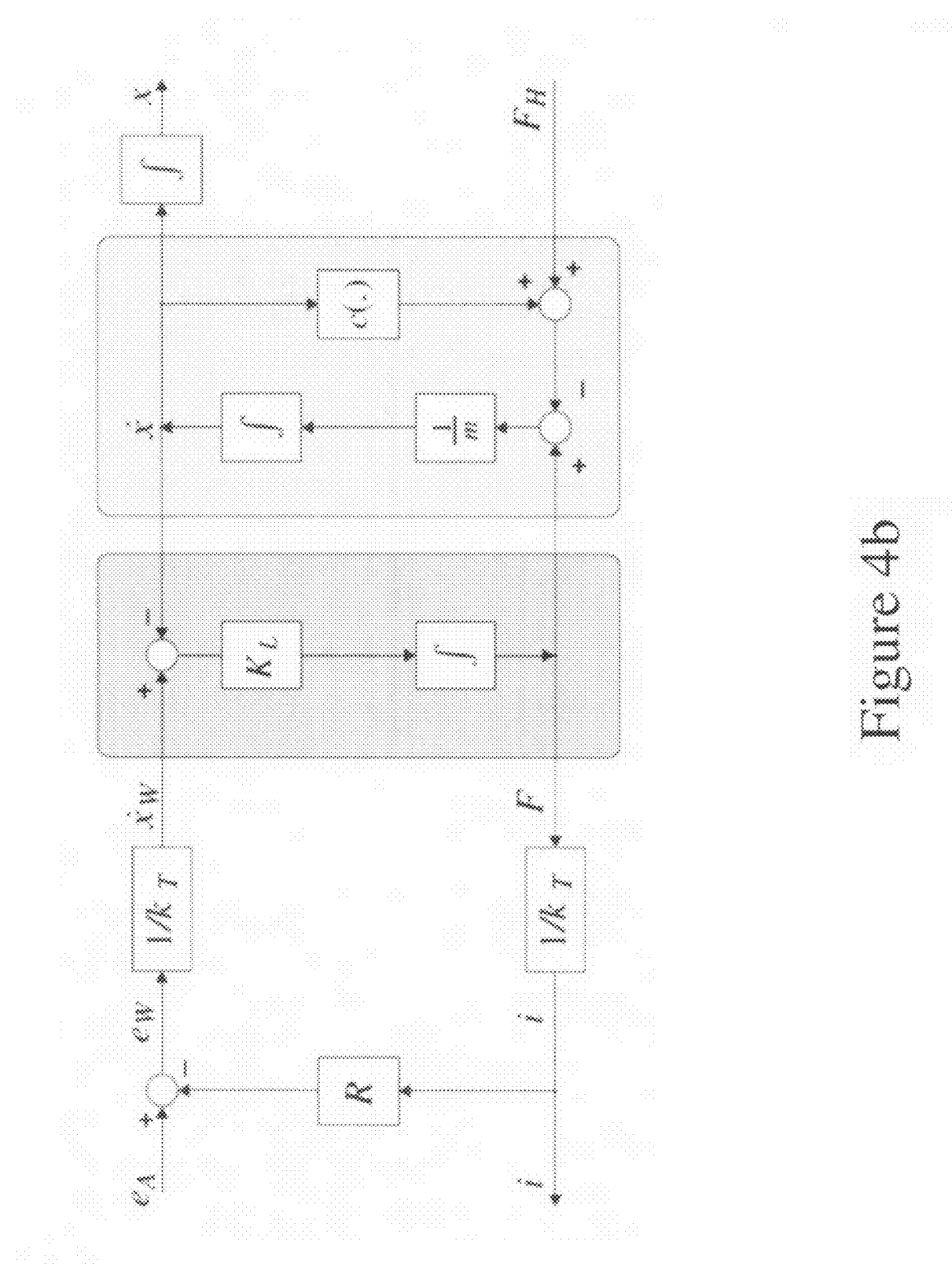
FIG. 4b shows the system dynamics with the motor inductance interpreted in the mechanical domain as a spring $K_L$ in an equivalent block scheme according to the present invention.

A further exemplary embodiment allows the implementation of arbitrary relationships between the force F and velocity $\dot{x}_W$, including dynamic relationships, such that the motor may render arbitrary virtual environments. Electrical currents and voltages provide information about the mechanical domain. As shown in FIG. 4a and FIG. 4b, the current i indicates a measurement of the force F, while the voltage $e_W$ can be reconstructed from $e_A$ through the knowledge of motor resistance and current to provide a measurement of the velocity $\dot{x}_W$. To implement arbitrary virtual environments, the system has to allow us to program the input-output relation between i and $e_W$.

Figure 6:
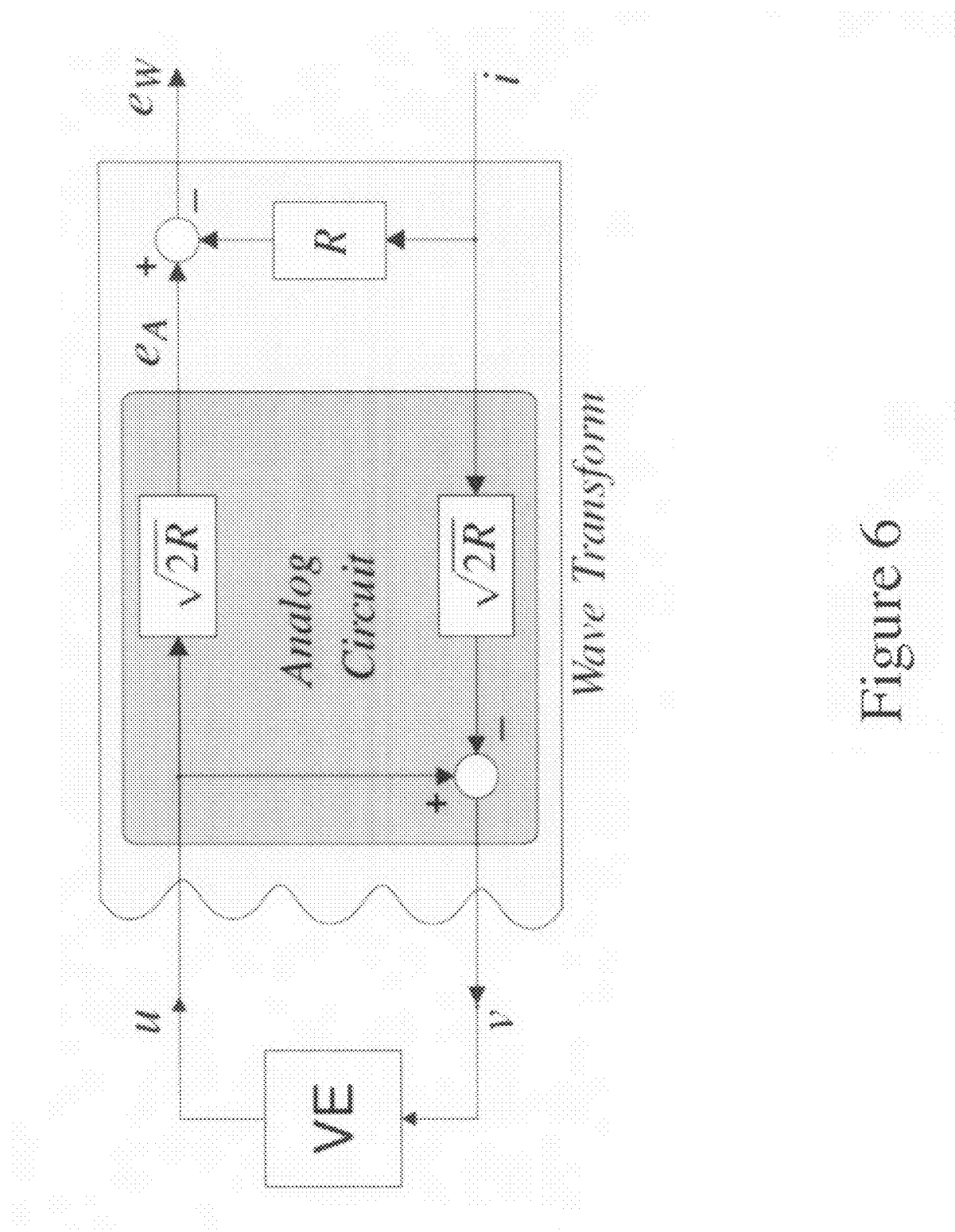
FIG. 6 shows an example implementation of the wave transform to interconnect the virtual environment (VE) to the electrical domain by means of an analog circuit according to the present invention.

Previous studies in the field of telerobotics (Niemeyer and Slotine 1997, 2004), showed that wave variables are a convenient setting to provide robustness to time delays, time discretization, and sampling issues. In view of these considerations, we interpret the motor resistance as part of a natural wave transform, as shown in FIG. 6. A wave transform encodes, without loss of information, the normal power variables of velocity and force or of voltage and current into wave variables u and v. According to Niemeyer and Slotine (2004), $$u(t) := \frac{e_W + Ri}{\sqrt{2R}} = \frac{B_R \dot{x}_W + F}{\sqrt{2B_R}} \tag{10}$$

$$v(t) := \frac{e_W - Ri}{\sqrt{2R}} = \frac{B_R \dot{x}_W - F}{\sqrt{2B_R}}$$

The equations on the right express the relationships between wave variables and equivalent mechanical quantities, where $\dot{x}_W(t)$ is the desired motion and F is the common force applied by the spring $K_L$ to the damper and to the rotor inertia m. The equivalent viscous damping $B_R$ serves as the wave impedance.

The change of coordinates introduced by the wave transform in equation (10) allows us to represent the overall instantaneous power P(t) flowing from the virtual environment to the controlled motor as:

$$P(t) = e_W(t)i(t) = \dot{x}_W(t)F(t) = \frac{1}{2}u^2(t) - \frac{1}{2}v^2(t) \tag{11}$$

Each wave variable carries its own power content with u(t) encoding the power flowing into the motor and v(t) representing the power flowing from the motor into the virtual environment. In classical haptic systems, energetic inconsistencies that lead to instability arise because one power variable, typically the feedback force F, is the output of a time-discrete algorithm while the velocity changes during each sampling interval. Here, power flow is individually described by each wave variable independently of the other. System passivity depends only on the magnitudes of the wave variables and is hence unaffected by delays or lags.

To complete the wave transform, the dark shaded part of FIG. 6 includes the two $\sqrt{2R}$ gains and the summing junction can be realized by means of an analog circuit. In particular, the output voltage $e_A$ is derived from current sensing as:

$$e_A(t) = \sqrt{2R}u(t)$$

$$v(t) = u(t) - \sqrt{2R}i(t) \tag{12}$$

Because the wave variables u(t) and v(t) exist as electrical signals in the analog circuit, a passive implementation of the virtual environment can be obtained in several ways. First, simple transfer functions D(s)=U(s)/V(s) can be realized in analog hardware. According to Niemeyer and Slotine (1997), their passivity is characterized as:

$$|D(s)| = \left|\frac{U(s)}{V(s)}\right| \leq 1 \tag{13}$$

Alternatively, v(t) and u(t) can be digitized and the virtual environment implemented on a computer either in wave space or in traditional power variables by use of a second decoding digital wave transformation. Energy consistency between the discrete and continuous time domains at the A/D interface is achieved if the sampled value $v_h$ used in the digital virtual environment is such that:

$$Tv_h^2 \leq \int_{(h-1)T}^{hT} v^2(\tau)d\tau \quad h \in \mathbb{N} \tag{14}$$

where T is the sampling period. It is noted that the condition in equation (14) is satisfied if the integral of the input wave is sampled:

$$v_h = \frac{1}{T}\left|\int_{(h-1)T}^{hT} v^2(\tau)d\tau\right| \tag{15}$$

which suggests taking advantage of the low-pass characteristics of an anti-aliasing filter to ensure energy consistency.

Passivity is achieved by avoiding energy growth in any wave variable, so that an energetically consistent wave interface guarantees a passive implementation. Moreover, computational delays do not change the energy in a wave variable and hence are also guaranteed not to affect system stability.

Haptic Interaction Through Wave Variables

Figure 7:
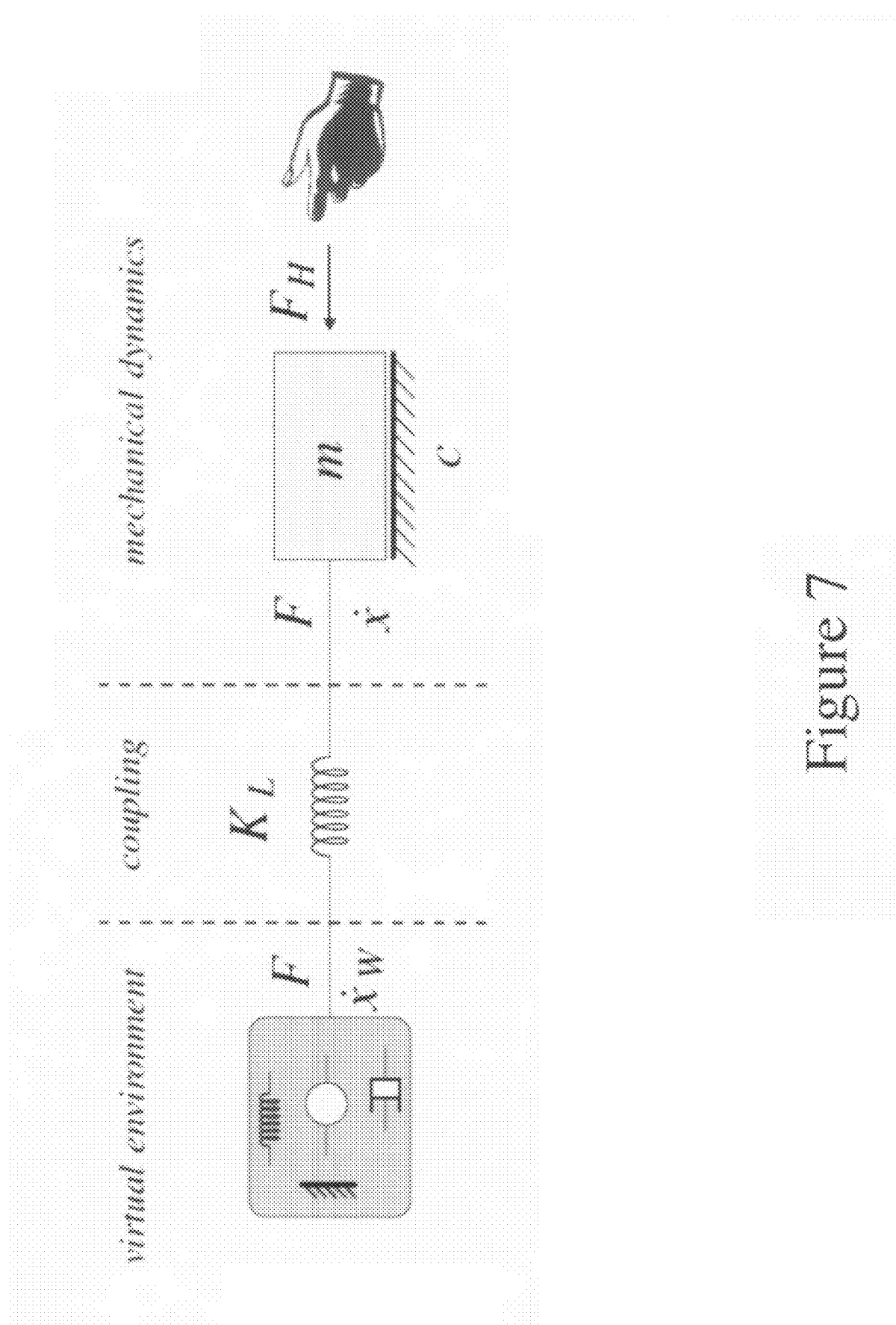
FIG. 7 shows motor inductance as a physical coupling with the virtual environment according to the present invention.

By integrating the motor resistance, the wave-haptics circuit of FIG. 6 allows us to directly control the velocity $\dot{x}_W$ at the end-point of the spring $K_L$, as shown in FIG. 7. This latter element therefore acts as coupler between the user and the virtual environment implemented in wave variables. It is noted that the coupling spring has the advantage of being a physical element and therefore not affected by the stability issues of a digital implementation.

The two most demanding virtual environments are free motion and perfectly rigid contact. Both imply an infinite frequency response (i.e., they are purely algebraic systems), as motion occurs immediately for any force in the former and forces are immediately created for any motion in the latter. These two virtual environments constitute the basis of every haptic display. The causality of an impedance device, designed to be light and back-drivable, clearly favors free motion and is challenged by the rendition of rigid contact. Assuming back-drivability, free motion avoids all forces (F=0) and reflects all power carried by the incoming wave v(t) back by means of u(t) as:

$$u(t)=v(t) \Leftrightarrow i=0 \forall e_W \Leftrightarrow F=0 \forall \dot{x}_W \tag{16}$$

where equation (10) is used to convert between wave and power variables. Dually, a rigid contact also reflects all power by suppressing any motion ($\dot{x}_W$=0):

$$u(t)=-v(t) \Leftrightarrow e_W=0 \forall i \Leftrightarrow \dot{x}_W=0 \forall F \tag{17}$$

Note that this does not hold the applied voltage $e_A$ at zero, but only cancels the voltage across the inductor and back-EMF. It does not short the motor; instead it effectively sets $e_A=R_i i$ as seen above in the section "encorderless position holding". Therefore, in this situation $K_L$ is the maximum stiffness that can be rendered to the user.

Robustness and Absolute Position Feedback

Because of thermal and other effects during motor operation, R can increase or vary with respect to its nominal value, thus making an exact calibration and subsequent tuning difficult in practice. Both the circuit of FIG. 5 and the wave transformation circuit of FIG. 6 fundamentally implement the same idea and require knowledge of R.

Figure 8:
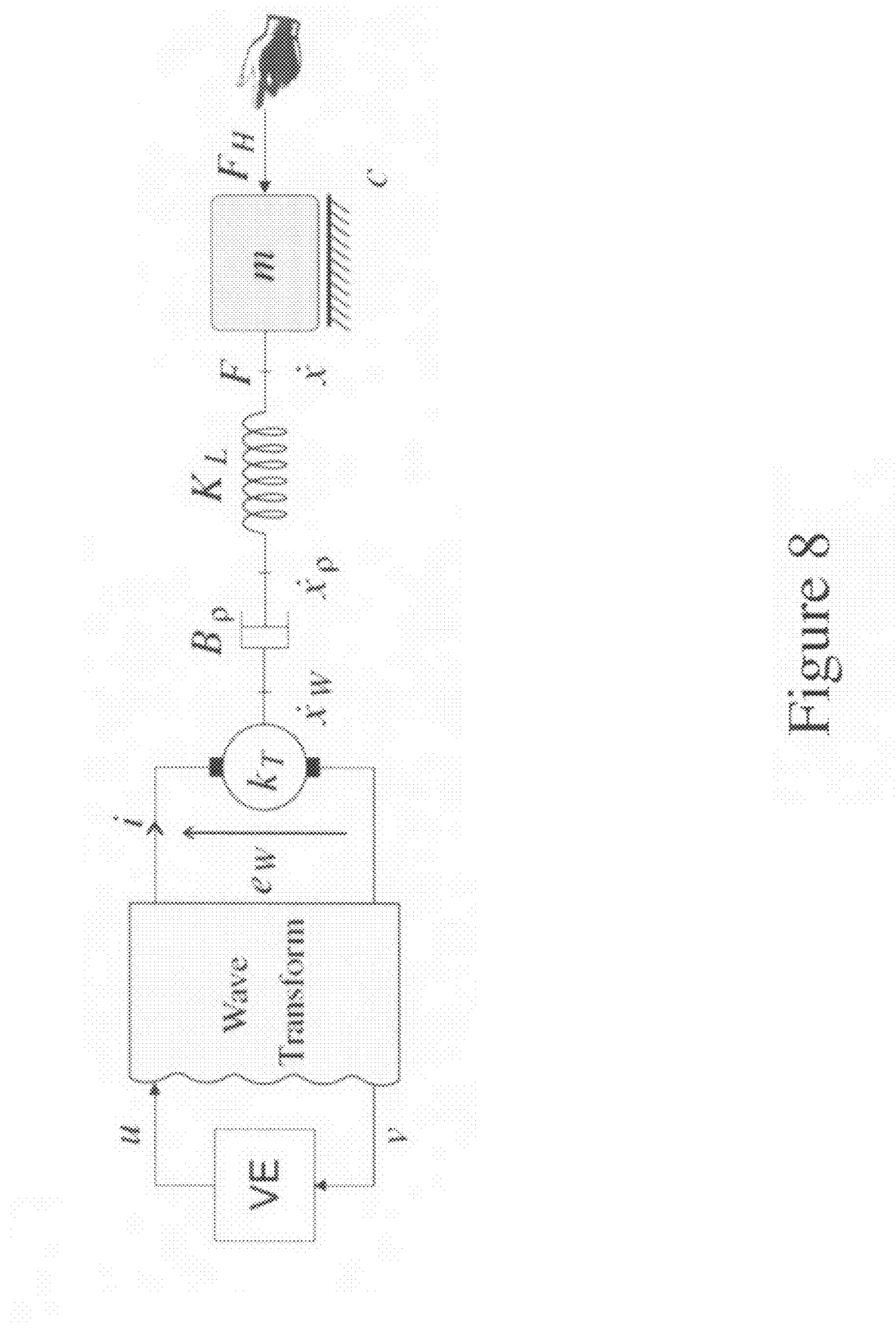
FIG. 8 shows according to the present invention an example of the mapping of the uncompensated residual resistance $\rho$ into a mechanical damper $B_\rho$. The wave circuit does not directly control the spring endpoint $x_\rho$.
Figure 9:
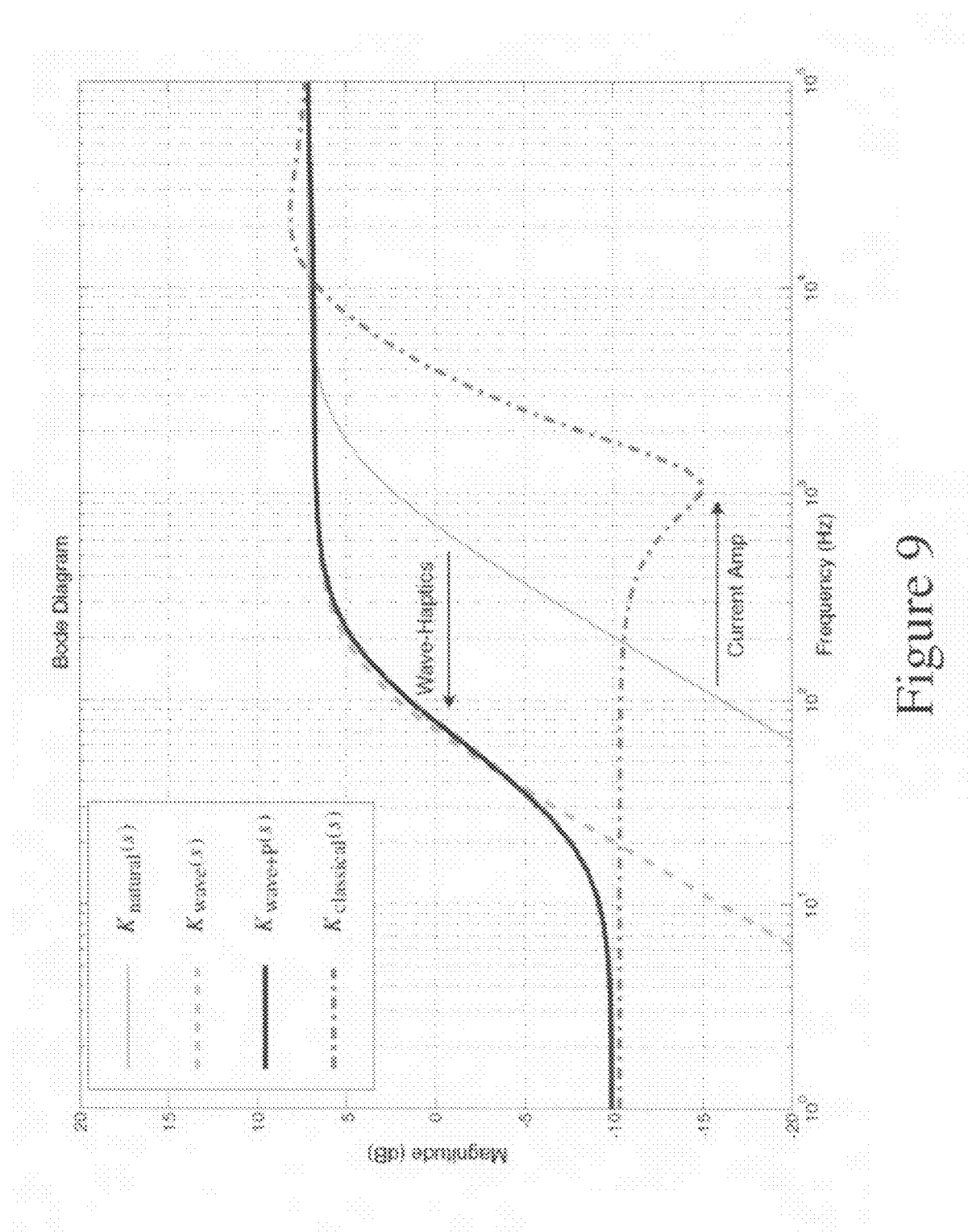
FIG. 9 shows according to the present invention bode diagrams describing the achievable stiffness of position feedback versus frequency. It compares an uncontrolled motor to a motor controlled by the present invention and to a motor controlled by a classical current amplifier. It shows the increased stiffness achievable by the present invention.
Figure 10:
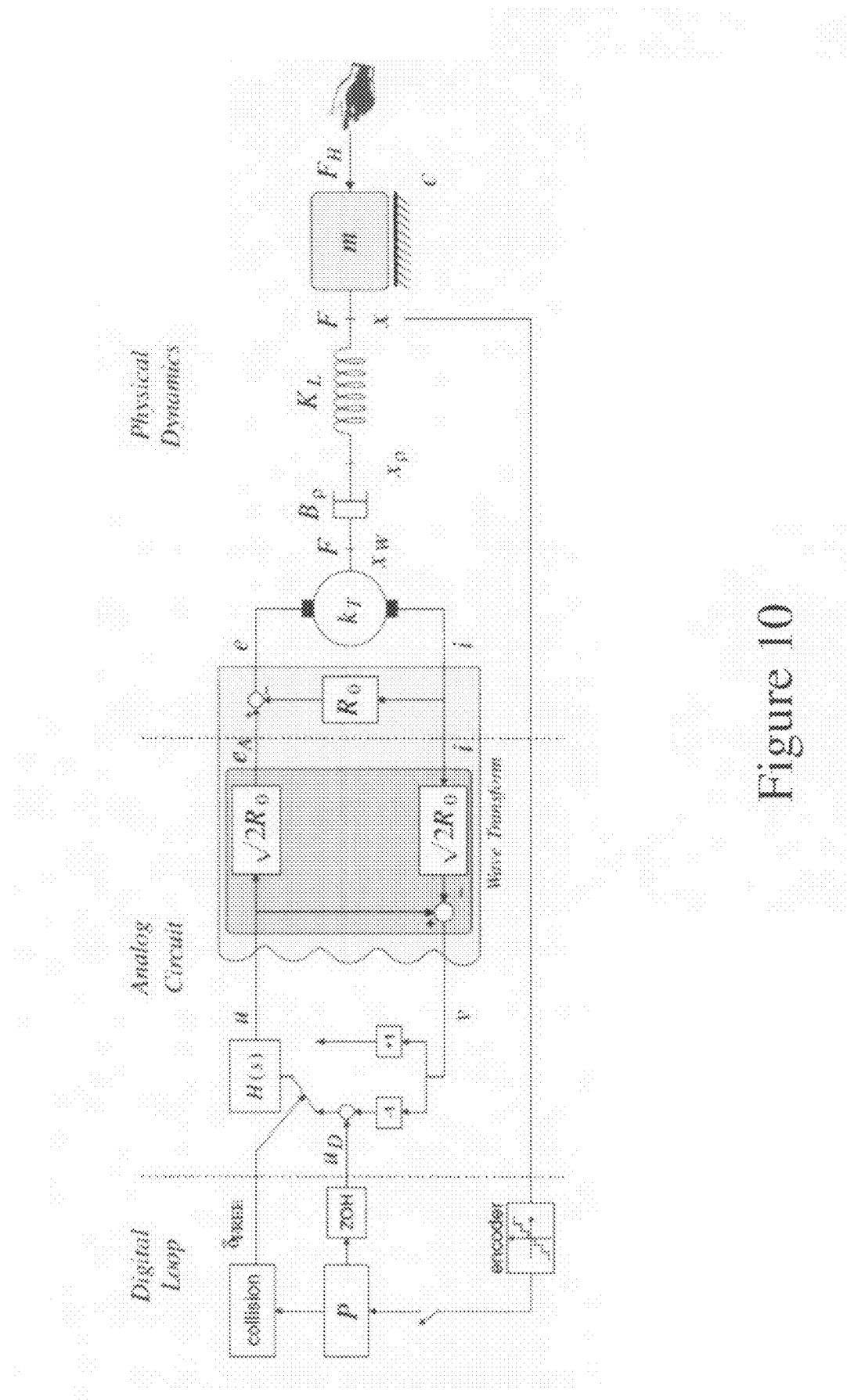
FIG. 10 shows an example of a scheme for virtual wall simulation according to the present invention. Collision detection drives an analog switch that selects between free space and stiff contact. In this latter case, proportional digital controller compensates for residual damper $B\rho$. The resulting voltage $e_A$ is applied to the motor.

A root locus analysis has suggested that robustness and passivity of the control scheme are retained if the estimated value of a tunable gain ($R_0$) approximates the actual resistance R, leaving a small residual ρ. In mechanical terms, the residual electrical resistance ρ maps into a viscous damper:

$$B_\rho = \frac{k_T^2}{\rho} \tag{18}$$

that is connected in series with the spring $K_L$. This situation is shown in FIG. 8, where we note that the velocity $\dot{x}_\rho$ of the spring endpoint differs from the velocity $\dot{x}_W$ controlled by the wave-haptics circuit:

$$\dot{x}_\rho = \dot{x}_W - \frac{1}{B_\rho}F \tag{19}$$

Although the system is able to exploit the stiff behavior at frequencies lower than the natural frequency R/L of the motor electrical pole, the presence of the residual damper $B_\rho$ is responsible for viscous behavior at frequencies up to ρ/L<R/L. At these frequencies, the spring endpoint $x_\rho$ may slowly drift from the desired position $x_W$. Note, overestimation and over-compensation with associated negative values of ρ leads to an active residual element. In this case, the endpoint may slowly drift against the user instead of with the user. In both cases the following solution prevents such drift.

Recovering the cascaded loop closure outlined in FIG. 1, absolute position feedback is used in a digital control loop to provide low frequency performance and drift cancellation during contact with a stiff virtual object. Since motor inductance L and torque constant $k_T$ are less temperature sensitive than the resistance R, an estimate of the spring end-point position $x_\rho$ can be derived as:

$$x_\rho = \frac{L}{k_T}i + x \tag{20}$$

where i and x are gathered through position and current sensors. A wave signal $u_P(t)$ is computed by a discrete time algorithm according to the proportional law:

$$u_P = P[x_{sp} - x_\rho] \tag{21}$$

where P is the proportional gain and $x_{sp}$ is the desired position for the endpoint $x_\rho$. Other control laws may be used to achieve other effects as a person of average skill would appreciate. Finally $u_P$ is summed to the output of the analog circuit (equation 12) to obtain:

$$U(s)=D(s)V(s)+H(s)U_P(s) \tag{22}$$

where H(s) is a high-frequency low-pass wave filter according to:

$$H(s) = \frac{\lambda}{s+\lambda} \tag{23}$$

and D(s) is a transfer of the overall dynamics in the wave domain according to:

$$D(s) = \frac{U(s)}{V(s)} = \eta(x)\frac{\lambda}{s+\lambda} \quad (24)$$

where the magnitude of η can be further tuned in the interval −1≦η≦1 to remove power and introduce damping.

By comparing equations (21) to (10), the compensation wave can be interpreted as an elastic force that is added to F in equation (10) to guarantee that $x_\rho$ reaches, at least in steady state, the desired position $x_{sp}$. With reference to equation (12), the wave signal $u_P(t)$ alters the applied voltage $e_A$, thereby moving $x_A$ and $x_W$. A similar effect could be achieved in the simple circuit of FIG. 5 adjusting $e_A$, though without the passivity and robustness understanding afforded by wave variables.

Humans are particularly sensitive at frequencies about 200 Hz, while at lower frequencies the poor position resolution of the neuromuscular apparatus limits our ability to identify the rendered stiffness. Therefore the feedback gain P, which only alters the low-frequency rendering, can be kept relatively small. This avoids many of the stability issues of digital implementation.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. All such variations are considered to be within the scope and spirit of the present invention as defined by the following claims and their legal equivalents.

REFERENCES

Niemeyer, G. and Slotine, J. (1997). Using wave variables for system analysis and robot control. *Proceedings of the IEEE International Conference on Robotics and Automation*, Albuquerque, N. Mex., April, Vol. 2, pp. 1619-1625.

Niemeyer, G. and Slotine, J. (2004). Telemanipulation with time delays. *International Journal of Robotics Research*, 23(9): 873-890.

Stramigioli, S., van der Schaft, A., Maschke, B., and Melchiorri, C. (2002). Geometric scattering in robotic telemanipulation. *IEEE Transactions on Robotics and Automation*, 18(4): 588-596.

What is claimed is:

1. A motor control amplifier for position feedback control, comprising:
   (a) a motor; and
   (b) an amplifier electrically coupled to said motor, wherein said amplifier applies a voltage to said motor, wherein said applied voltage is equivalent to the electrical resistance of said motor multiplied by the current of said motor, wherein said amplifier is characterized by canceling out the electrical resistance of said motor and thereby providing said position feedback control through the inductance of said motor.

2. The motor control amplifier as set forth in claim 1, wherein said applied voltage is equivalent to said electrical resistance of said motor multiplied by said current of said motor plus a command term or voltage, wherein said amplifier is characterized by canceling out the electrical resistance of said motor and thereby providing said position feedback control relative to a setpoint through the inductance of said motor.

3. The motor control amplifier as set forth in claim 1, wherein said amplifier is implemented as an analog circuit.

4. A method of position feedback control, comprising: electrically coupling an amplifier to a motor, wherein said amplifier applies a voltage to said motor, wherein said applied voltage is equivalent to the electrical resistance of said motor multiplied by the current of said motor, wherein said amplifier is characterized by canceling out the electrical resistance of said motor and thereby providing said position feedback control through the inductance of said motor.

5. The method as set forth in claim 4, wherein said applied voltage is equivalent to said electrical resistance of said motor multiplied by said current of said motor plus a command term or voltage, wherein said amplifier is characterized by canceling out the electrical resistance of said motor and thereby providing said position feedback control relative to a setpoint through the inductance of said motor.

6. The method as set forth in claim 4, further comprising implementing said amplifier as an analog circuit.

7. The method as set forth in claim 4, wherein said electrical resistance of said motor provides a wave transformation for haptic rendering.

* * * * *

UNITED STATES PATENT AND TRADEMARK OFFICE
CERTIFICATE OF CORRECTION

| | | |
|---|---|---|
| PATENT NO. | : 7,710,061 B2 | |
| APPLICATION NO. | : 11/891052 | |
| DATED | : May 4, 2010 | |
| INVENTOR(S) | : Günter Niemeyer et al. | |

It is certified that error appears in the above-identified patent and that said Letters Patent is hereby corrected as shown below:

In the specification

Paragraph in Column 1, starting at line 10

Change from:

STATEMENT REGARDING FEDERALLY SPONSORED RESEARCH OR DEVELOPMENT

The present invention was supported in part by grant number R33 LM 007295 both from the National Institutes of Health (NIH). The U.S. Government has certain rights in the invention.

To:

STATEMENT REGARDING FEDERALLY SPONSORED RESEARCH OR DEVELOPMENT

This invention was made with Government support under contract LM007295 awarded by the National Institutes of Health. The Government has certain rights in the invention.

Signed and Sealed this
Tenth Day of November, 2015

Michelle K. Lee
*Director of the United States Patent and Trademark Office*